(12) United States Patent
Park et al.

(10) Patent No.: US 11,420,635 B2
(45) Date of Patent: Aug. 23, 2022

(54) DEVICE AND METHOD FOR CONTROLLING TRAVELING OF VEHICLE

(71) Applicants: Hyundai Motor Company, Seoul (KR); Kia Motors Corporation, Seoul (KR)

(72) Inventors: Jae Hyung Park, Seoul (KR); Woo Sung Lee, Seoul (KR); Eun Woo Na, Gyeonggi-Do (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 183 days.

(21) Appl. No.: 16/859,570

(22) Filed: Apr. 27, 2020

(65) Prior Publication Data

US 2021/0197830 A1 Jul. 1, 2021

(30) Foreign Application Priority Data

Dec. 26, 2019 (KR) .......................... 10-2019-0175478

(51) Int. Cl.
*B60W 40/076* (2012.01)
*B60W 10/22* (2006.01)

(52) U.S. Cl.
CPC .......... *B60W 40/076* (2013.01); *B60W 10/22* (2013.01); *B60W 2520/10* (2013.01); *B60W 2530/18* (2013.01); *B60W 2552/15* (2020.02); *B60W 2556/40* (2020.02)

(58) Field of Classification Search
CPC .......... B60W 40/076; B60W 2556/40; B60W 2552/15; B60W 10/22; B60W 2520/10; B60W 2530/18; B60W 2552/00; B60W 2710/22; B60W 40/02; B60G 2400/82; B60G 2400/824; B60G 2500/10; B60G 2500/30; B60G 2800/704; B60G 2800/912; B60G 2400/0512; B60G 17/0161
See application file for complete search history.

(56) References Cited

U.S. PATENT DOCUMENTS

| | | | | |
|---|---|---|---|---|
| 2004/0204798 A1* | 10/2004 | Imada | ................... | G01C 21/28 701/1 |
| 2013/0297198 A1* | 11/2013 | Vande Velde | .......... | G01C 21/28 701/409 |
| 2020/0005641 A1* | 1/2020 | Park | ....................... | G08G 1/146 |

* cited by examiner

*Primary Examiner* — Tyler J Lee
*Assistant Examiner* — Yufeng Zhang
(74) *Attorney, Agent, or Firm* — Fox Rothschild LLP

(57) ABSTRACT

A device for controlling traveling of a vehicle is provided. The device includes a sensor that obtains vehicle traveling information, a navigation that obtains vehicle position information, and a controller that determines whether the vehicle has entered a building based on the vehicle traveling information and the vehicle position information. The controller calculates a traveling control amount based on the determination result. Accordingly, the device actively adjusts a vehicle height even when the vehicle enters the building and travels on a slope in the building preventing damage to a lower portion of the vehicle.

14 Claims, 5 Drawing Sheets

DEVICE AND METHOD FOR CONTROLLING TRAVELING OF VEHICLE

CROSS-REFERENCE TO RELATED APPLICATION

This application claims the benefit of priority to Korean Patent Application No. 10-2019-0175478, filed on Dec. 26, 2019, the entire contents of which are incorporated herein by reference.

TECHNICAL FIELD

The present disclosure relates to a device and a method for controlling traveling of a vehicle, and more particularly, to a device and a method for controlling traveling of a vehicle that actively adjust vehicle height even when traveling on a slope within a building.

BACKGROUND

Recently, technologies that support comfortable traveling in a vehicle have been developed to improve a riding quality of a user within a vehicle. Among the technologies, an air suspension has been developed and mounted on the vehicle to alleviate vibration or shock transmitted from a road surface while the vehicle is being driven. The air suspension may adjust an air pressure based on conditions, such as a road surface, the number of occupants within the vehicle, and the like to actively improve a stability and the riding quality based on the road surface and a traveling state.

When a slope of a road changes drastically, since a change in a vehicle height increases, a bottom of the vehicle rubs or drags against a floor. Therefore, the air suspension must be controlled to adjust the vehicle height based on an inclination angle of the road. However, when the slope of the road is changed drastically as the vehicle enters a building, such as an underground parking lot, the vehicle is unable to distinguish a slope in the building from a ground slope, and thus, is unable to control the air suspension, causing difficult in actively controlling the vehicle on the slope in the building.

SUMMARY

The present disclosure provides a device and a method for controlling traveling of a vehicle that may actively adjust vehicle height even when traveling on a slope within a building. The technical problems to be solved by the present inventive concept are not limited to the aforementioned problems, and any other technical problems not mentioned herein will be clearly understood from the following description by those skilled in the art to which the present disclosure pertains.

According to an aspect of the present disclosure, a device for controlling traveling of a vehicle may include a sensor configured to obtain vehicle traveling information, a navigation for obtaining vehicle position information, and a controller configured to determine whether the vehicle has entered a building based on the vehicle traveling information and the vehicle position information, and calculate a traveling control amount based on the determination result.

In addition, the controller may be configured to calculate an inclination angle of the vehicle based on the vehicle traveling information, calculate a first traveling distance traveled by the vehicle for a predetermined period of time based on the vehicle traveling information, and calculate a second traveling distance traveled by the vehicle for the predetermined period of time based on the vehicle position information. The controller may then be configured to determine whether a difference between the first traveling distance and the second traveling distance exceeds a reference value, and determine that the vehicle has entered the building when the difference exceeds the reference value.

The vehicle position information may include inclination information of a road surface. The controller may be configured to determine that the vehicle has entered the building when the inclination information of the road surface is unable to be received. The controller may be configured to calculate the traveling control amount based on the inclination angle of the vehicle in response to determining that the vehicle has entered the building.

In addition, the controller may be configured to calculate a vehicle height based on the inclination angle of the vehicle and calculate the traveling control amount to correspond to the calculated vehicle height. The controller may also be configured to calculate the traveling control amount based on a speed of the vehicle and the inclination angle of the vehicle in response to determining that the vehicle has entered the building. The controller may then be configured to operate a damper using the calculated traveling control amount.

According to another aspect of the present disclosure, a method for controlling traveling of a vehicle may include obtaining vehicle traveling information and vehicle position information, determining whether the vehicle has entered a building based on the vehicle traveling information and the vehicle position information, and calculating a traveling control amount based on the determination result. The method may further include calculating an inclination angle of the vehicle based on the vehicle traveling information.

In addition, the determining of whether the vehicle has entered the building may include calculating a first traveling distance traveled by the vehicle for a predetermined period of time based on the vehicle traveling information, calculating a second traveling distance traveled by the vehicle for the predetermined period of time based on the vehicle position information, determining whether a difference between the first traveling distance and the second traveling distance exceeds a reference value, and determining that the vehicle has entered the building in response to determining that the difference exceeds the reference value.

The vehicle position information may include inclination information of a road surface. The determining of whether the vehicle has entered the building may include determining whether the inclination information of the road surface is received, and determining that the vehicle has entered the building when the inclination information of the road surface is unable to be received. The method may further include calculating the traveling control amount based on the inclination angle of the vehicle in response to detemining that the vehicle has entered the building.

The method may further include calculating a vehicle height based on the inclination angle of the vehicle, and calculating the traveling control amount to correspond to the calculated vehicle height. In addition, the method may include calculating the traveling control amount based on a speed of the vehicle and the inclination angle of the vehicle in response to determining determined that the vehicle has entered the and operating a damper using the calculated traveling control amount.

BRIEF DESCRIPTION OF THE DRAWINGS

The above and other objects, features and advantages of the present disclosure will be more apparent from the following detailed description taken in conjunction with the accompanying drawings.

DETAILED DESCRIPTION

Figure 1:
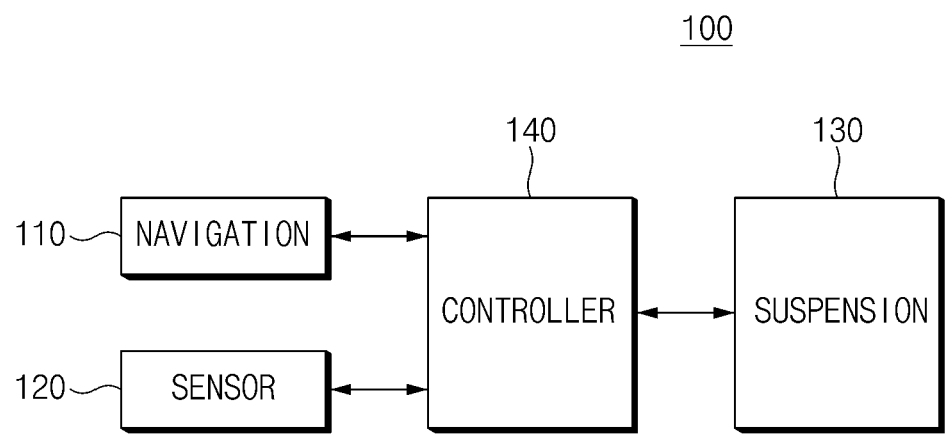
FIG. 1 is a view illustrating a configuration of a vehicle traveling controlling device according to an exemplary embodiment of the present disclosure.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, combustion, plug-in hybrid electric vehicles, hydrogen-powered vehicles and other alternative fuel vehicles (e.g. fuels derived from resources other than petroleum).

Although exemplary embodiment is described as using a plurality of units to perform the exemplary process, it is understood that the exemplary processes may also be performed by one or plurality of modules. Additionally, it is understood that the term controller/control unit refers to a hardware device that includes a memory and a processor. The memory is configured to store the modules and the processor is specifically configured to execute said modules to perform one or more processes which are described further below.

Furthermore, control logic of the present disclosure may be embodied as non-transitory computer readable media on a computer readable medium containing executable program instructions executed by a processor, controller/control unit or the like. Examples of the computer readable mediums include, but are not limited to, ROM, RAM, compact disc (CD)-ROMs, magnetic tapes, floppy disks, flash drives, smart cards and optical data storage devices. The computer readable recording medium can also be distributed in network coupled computer systems so that the computer readable media is stored and executed in a distributed fashion, e.g., by a telematics server or a Controller Area Network (CAN).

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Hereinafter, some exemplary embodiments of the present disclosure will be described in detail with reference to the exemplary drawings. In adding the reference numerals to the components of each drawing, it should be noted that the identical or equivalent component is designated by the identical numeral even when they are displayed on other drawings. Further, in describing the exemplary embodiment of the present disclosure, a detailed description of well-known features or functions will be ruled out in order not to unnecessarily obscure the gist of the present disclosure.

In describing the components of the exemplary embodiment according to the present disclosure, terms such as first, second, "A", "B", (a), (b), and the like may be used. These terms are merely intended to distinguish one component from another component, and the terms do not limit the nature, sequence or order of the constituent components. Unless otherwise defined, all terms used herein, including technical or scientific terms, have the same meanings as those generally understood by those skilled in the art to which the present disclosure pertains. Such terms as those defined in a generally used dictionary are to be interpreted as having meanings equal to the contextual meanings in the relevant field of art, and are not to be interpreted as having ideal or excessively formal meanings unless clearly defined as having such in the present application.

FIG. 1 is a view illustrating a configuration of a vehicle traveling controlling device according to an exemplary embodiment of the present disclosure. As shown in FIG. 1, a vehicle traveling control device 100 may include a navigation 110, a sensor 120, a suspension 130, and a controller 140.

The navigation 110 may include a global positioning system (GPS) receiver configured to receive respective position signals from a plurality of global positioning systems, and may be configured to obtain vehicle position information from the position signals. In addition, the navigation 110 may be configured to map-match the vehicle position information to pre-stored map data, search a route from a current position to a destination when the destination is input from a user, and provide the searched route. The vehicle position information obtained by the navigation 110 may include road surface inclination information of a road ahead received from the map data. In this connection, the road surface inclination information may refer to an angle between a road surface and a ground.

In addition, the navigation 110 may include a separate output device configured to output information provided through the navigation. Accordingly, the navigation 110 may include a display unit and a sound output device. The display may be configured to visually display various information, such as a map, the searched route, road surface inclination information of the road ahead, and the like, and may be implemented as a touch screen panel according to an exemplary embodiment. The sound output device may be configured to acoustically output the various information, such as the map, the searched route, the road surface inclination information of the road ahead, and the like, and may include a speaker according to an exemplary embodiment.

The sensor 120 may be configured to obtain vehicle traveling information. In this connection, the vehicle traveling information may include a speed and an acceleration of the vehicle. In this connection, the acceleration may include a longitudinal acceleration. Accordingly, the sensor 120 may include a wheel speed sensor and a longitudinal acceleration sensor.

The suspension 130 is an apparatus that secures a wheel to a shaft of the vehicle to alleviate shock and vibration from the road surface. A vehicle height may be increased to protect a vehicle body on a road with a bumpy or uneven road surface, and the vehicle height may be decreased to reduce an air resistance on a road on which high speed traveling is available such as an expressway, thereby increasing a traveling stability. The suspension 130 may include a damper configured to receive a displacement based on a vertical movement of the vehicle, and the damper may provide a damping force. In this connection, the damping force of the damper may refer to a degree of absorbing the vibration and the shock, and the damping force may be adjusted by a traveling control amount calculated from the controller 140.

As the damping force of the damper increases, a hard feeling may be provided to a driver. In particular when the damping force increases, the vehicle height is fixed thus allowing for minimal change in the vehicle height. As the damping force is reduced, a softer feeling may be provided to the driver since the vehicle height has the ability to adjust based on the varied road surface. According to an exemplary embodiment, the suspension 130 may operate in a hydraulic driving scheme and a pneumatic driving scheme.

The controller 140 may be implemented by various processing devices, such as a microprocessor with a built-in semiconductor chip capable of performing an operation or an execution of various commands, and may be configured to execute overall operations of the vehicle traveling control device according to an exemplary embodiment of the present disclosure. More specifically, the controller 140 may be configured to calculate an inclination angle of the vehicle based on the vehicle traveling information obtained by the sensor 120, determine whether the vehicle has entered the building when the inclination angle of the vehicle exceeds a critical angle, and calculate the traveling control amount based on the determination result. In this connection, the inclination angle of the vehicle may refer to an angle between the vehicle and the ground. For example, the inclination angle of the vehicle may be different ranges according to the type of the vehicle, and may have ranges about 8 degrees to 9 degrees.

First, the controller 140 may be configured to obtain the vehicle traveling information including the speed and the acceleration of the vehicle from the sensor 120 and calculate the inclination angle of the vehicle based on the vehicle traveling information. According to an exemplary embodiment, the controller 140 may be configured to obtain the longitudinal acceleration of the vehicle from the longitudinal acceleration sensor of the vehicle, and remove noise of a value obtained from the sensor using a low frequency filter. In addition, the controller 140 may be configured to obtain the speed of the vehicle from the wheel speed sensor of the vehicle, and remove noise of a differential value of the vehicle speed, which is a value obtained from the wheel speed sensor, using the low frequency filter.

The controller 140 may further be configured to obtain information regarding the longitudinal acceleration from which the noise is removed from the longitudinal acceleration sensor and information regarding the speed from which the noise is removed from the wheel speed sensor, calculate a speed generated in a longitudinal direction by gravity, and calculate the inclination angle of the vehicle based on the speed generated in the longitudinal direction. The controller 140 may be configured to determine whether the inclination angle of the vehicle exceeds the critical angle. In response to determining that the inclination angle of the vehicle exceeds the critical angle, the controller 140 may be configured to determine whether the vehicle has entered the building. According to an exemplary embodiment, the controller 140 may be configured to determine whether the vehicle has entered the building based on a distance traveled by the vehicle, and determine whether the vehicle has entered based on whether road information (e.g., a road inclination angle) is capable of being received from the navigation.

First, according to an exemplary embodiment, the controller 140 may be configured to obtain the position information from the navigation 110 and calculate a first traveling distance of the vehicle per hour based on the position information to determine whether the vehicle has entered the building. In this connection, the first traveling distance may refer to a traveling distance of the vehicle calculated by the controller 140 by combining positions of the vehicle received by the GPS receiver for a predetermined period of time. In addition, the controller 140 may be configured to obtain the traveling information from the sensor 120 and calculate a second traveling distance of the vehicle per hour based on the traveling information. In this connection, the second traveling distance may refer to a traveling distance of the vehicle calculated by the controller 140 based on speed information obtained by the wheel speed sensor of the vehicle for the predetermined period of time.

The controller 140 may be configured to determine whether a difference between the first traveling distance and the second traveling distance exceeds a reference value. In response to determining that the difference between the first traveling distance and the second traveling distance exceeds the reference value, the controller 140 may be configured to determine that the vehicle has entered the building. In other words, the determination by the controller 140 that the difference between the first traveling distance calculated based on the positions of the vehicle received by the GPS receiver and the second traveling distance calculated based on the wheel speed sensor exceeds the reference value may indicate that the vehicle actually traveled by the second traveling distance but the first traveling distance calculated based on the vehicle position information was not calculated as much as the second traveling distance. This is because the GPS receiver did not accurately receive the position of the vehicle. The reference value may vary according to the navigation performance.

Therefore, in response to determining that the difference between the first traveling distance and the second traveling distance exceeds the reference value, the controller 140 may be configured to determine that the vehicle has entered the building. On the other hand, in response to detemining that the difference between the first traveling distance and the second traveling distance is less than the reference value, the controller 140 may be configured to determine that the second traveling distance actually traveled by the vehicle is similar to the first traveling distance calculated based on the vehicle position information. This may indicate that the GPS receiver accurately received the position of the vehicle. Thus, the controller 140 may be configured to determine that the vehicle has not entered the building.

According to another exemplary embodiment, the controller 140 may be configured to determine whether the road ahead information is capable of being received from the navigation 110 to determine whether the vehicle has entered the building. In this connection, the road ahead information may include the road surface inclination information of the road. In response to determining that the road ahead information is unable to be received from the navigation 110, the controller 140 may be configured to determine that the vehicle has entered the building. On the other hand, in response to determining that the road ahead information is able to be received, the controller 140 may be configured to determine that the vehicle has not entered the building.

In response to determining that the inclination angle of the vehicle exceeds the critical angle, and that the vehicle has entered the building the controller 140 may be configured to determine that the vehicle is traveling on a slope within the building. According to an exemplary embodiment, the controller 140 may be configured to determine that the vehicle has entered an underground parking lot or a ground parking lot in the building.

The controller 140 may then be configured to calculate the traveling control amount based on the inclination angle of the vehicle when entering the building. In other words, since the position information and the road ahead information are unable to be received from the navigation 110 when the vehicle enters the building, the controller 140 may be configured to calculate the traveling control amount based on the inclination angle of the vehicle calculated based on the information sensed by the sensor 120. In general, the greater the inclination angle of the vehicle and the greater the speed of the vehicle, the greater the damage of a lower portion of the vehicle. Therefore, the speed of the vehicle as well as the inclination angle of the vehicle may be considered in calculating the traveling control amount.

According to an exemplary embodiment, the controller 140 may be configured to calculate the traveling control amount based on the inclination angle of the vehicle. The controller 140 may be configured to calculate the vehicle height to be high such that the lower portion of the vehicle is not damaged as the inclination angle of the vehicle increases. Further, the controller 140 may be configured to calculate the traveling control amount of the suspension 130 to correspond to the vehicle height. According to an exemplary embodiment, the controller 140 may be configured to calculate the vehicle height based on the inclination angle of the vehicle as shown in Table 1.

TABLE 1

| | Inclination angle of vehicle | | | |
|---|---|---|---|---|
| | 5 degrees | 10 degrees | 20 degrees | 30 degrees |
| Vehicle height | 10 mm | 15 mm | 20 mm | 30 mm |

A vehicle height control speed of the suspension is relatively low, so that it is preferable that the controller 140 calculates a vehicle height at which the lower portion of the vehicle is not damaged based on the inclination angle and calculates a corresponding traveling control amount to operate the suspension as soon as it is determined that the inclination angle of the vehicle exceeds the critical angle and the vehicle has entered the building.

In addition, the controller 140 may be configured to calculate the traveling control amount of the vehicle based on the inclination angle of the vehicle and the speed of the vehicle. A pressing phenomenon of front and rear portions of the vehicle body by inertia of the vehicle body occurs at a point where a drastic inclination angle occurs. A pressing degree depends on the inclination angle and the speed of the vehicle. Therefore, the controller 140 may be configured to calculate the traveling control amount that the lower portion of the vehicle body is not damaged based on the inclination angle and the speed of the vehicle, and may be configured to operate the damper based on the traveling control amount. According to an exemplary embodiment, the controller 140 may be configured to calculate the traveling control amount for operating the damper based on the inclination angle of the vehicle and the speed of the vehicle as shown in Table 2.

TABLE 2

| Speed of vehicle | Inclination angle of vehicle 5 degrees | Inclination angle of vehicle 10 degrees | Inclination angle of vehicle 20 degrees | Inclination angle of vehicle 30 degrees |
|---|---|---|---|---|
| 10 kph | 0 (SOFT) | 30 | 60 | 80 |
| 30 kph | 10 | 40 | 70 | 90 |
| 50 kph | 20 | 50 | 80 | 100 (HARD) |

In addition, the damper may be operating based on the traveling control amount calculated from the controller 140 to provide the damping force corresponding to the traveling control amount. According to an exemplary embodiment, the controller 140 may be configured to calculate the traveling control amount to increase the damping force as the inclination angle of the vehicle and the speed of the vehicle increase, and may be configured to calculate the traveling control amount to decrease the damping force as the inclination angle of the vehicle and the speed of the vehicle decrease. Since a control speed of the damper is relatively rapid, the controller 140 may be configured to operate the damper in response to the speed of the vehicle changing in real time.

Figure 2:
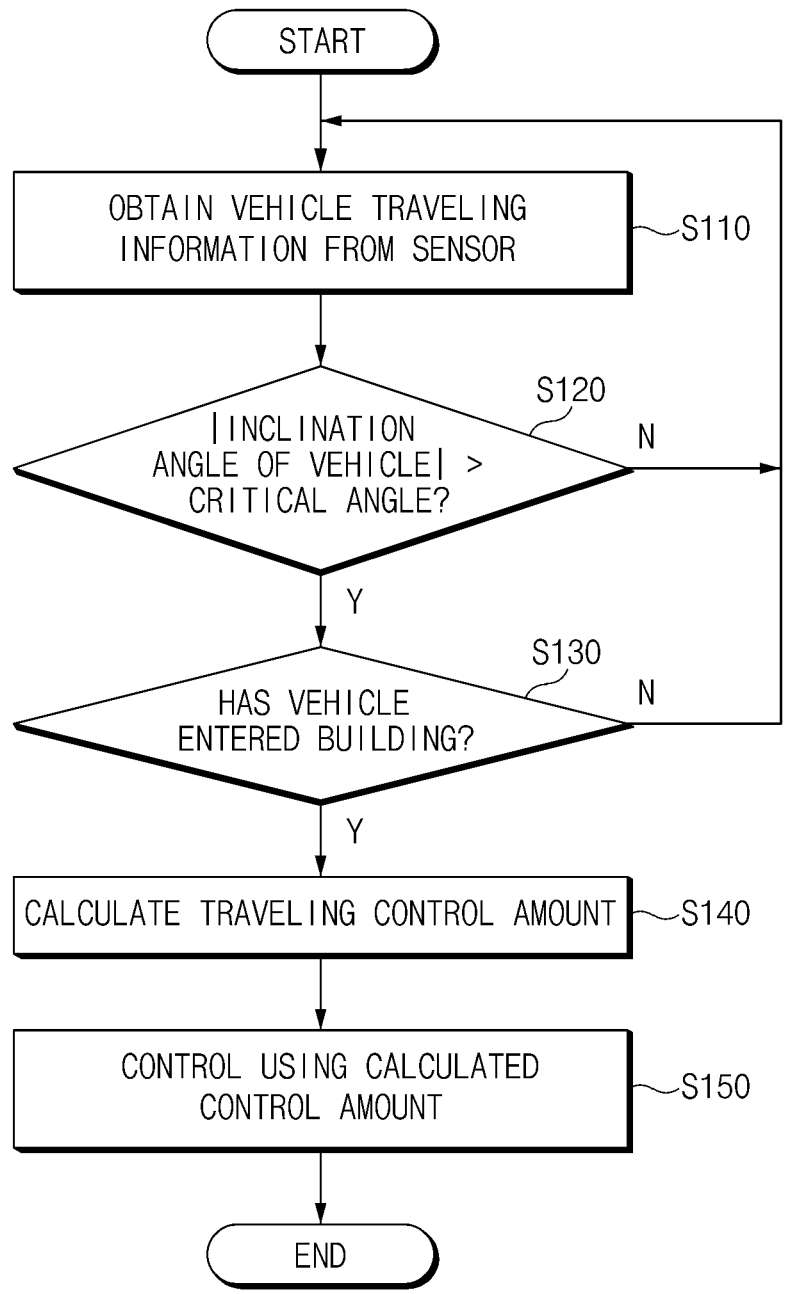
FIG. 2 is a flowchart illustrating a vehicle traveling controlling method according to an exemplary embodiment of the present disclosure.

FIG. 2 is a flowchart illustrating a vehicle traveling controlling method according to an exemplary embodiment of the present disclosure. As shown in FIG. 2, the controller 140 may be configured to obtain the vehicle traveling information from the sensor 120. The controller 140 may be configured to obtain the vehicle traveling information from the sensor 120 (S110). The vehicle traveling information in 'S110' may include the speed and the acceleration of the vehicle.

The controller 140 may be configured to calculate the inclination angle of the vehicle based on the vehicle traveling information obtained in 'S110', and determine whether the inclination angle of the vehicle exceeds the critical angle (S120). In response to detemining in 'S120' that the inclination angle of the vehicle exceeds the critical angle (Y), the controller 140 may be configured to determine whether the vehicle has entered the building (S130). A detailed description of the operation of determining whether the vehicle has entered the building in 'S130' will be described with reference to FIGS. 3 and 4.

In response to determining in 'S130' that the vehicle has entered the building, the controller 140 may be configured to determine that the vehicle is traveling on the slope in the building, and may be configured to calculate the traveling control amount (S140). When the vehicle has entered the building, since the position information and the road ahead information are unable to be received from the navigation 110, the controller 140 may be configured to calculate the traveling control amount based on the inclination angle of the vehicle calculated based on the information sensed by the sensor 120 in S140. In general, the greater the inclination angle of the vehicle and the greater the speed of the vehicle, the greater the damage of the lower portion of the vehicle.

Therefore, the speed of the vehicle as well as the inclination angle of the vehicle may be taken into account in calculating the traveling control amount. Therefore, the traveling control amount may be calculated based on the inclination angle of the vehicle and the speed of the vehicle.

When calculating the traveling control amount based on the inclination angle of the vehicle in 'S140', the controller 140 may be configured to calculate the vehicle height to be high such that the lower portion of the vehicle is not damaged as the inclination angle of the vehicle increases, and may be configured to calculate the traveling control amount of the suspension 130 to correspond to the vehicle height. In addition, when calculating the traveling control amount based on the inclination angle of the vehicle and the speed of the vehicle in 'S140', the controller 140 may be configured to calculate the traveling control amount that the lower portion of the vehicle is not damaged by the pressing phenomenon of the vehicle, and may be configured to operate the damper based on the calculated traveling control amount.

The controller 140 may be configured to operate the damper using the traveling control amount calculated in 'S140' (S150). In 'S150', the controller 140 may be configured to operate the suspension or the damper using the traveling control amount. The damper may be operated based on the traveling control amount calculated from the controller 140 to provide the damping force corresponding to the traveling control amount. Therefore, the controller 140 may be configured to operate using the calculated traveling control amount, thereby more easily preventing the lower portion of the vehicle from being damaged.

Figure 3:
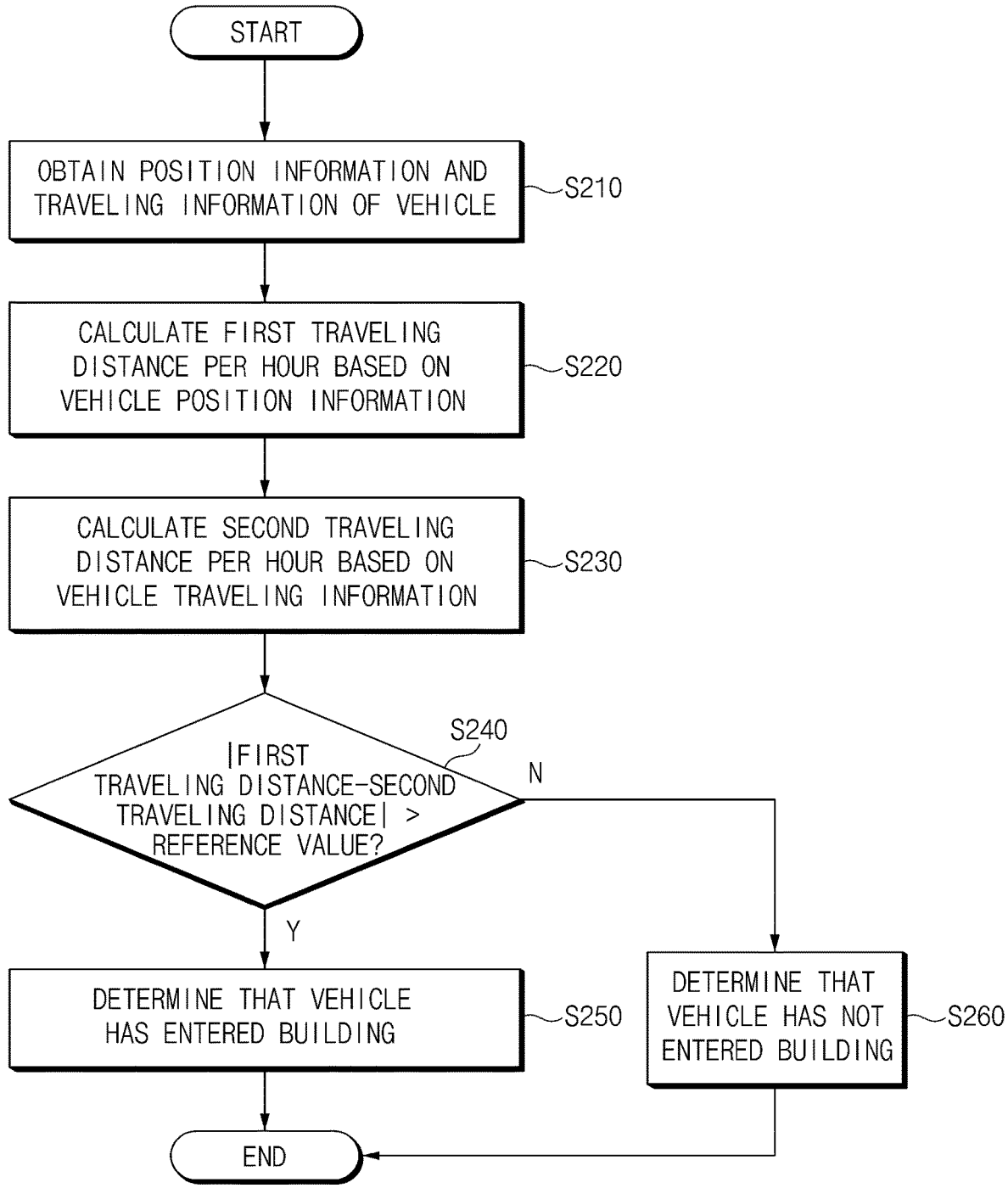
FIG. 3 is a flowchart illustrating a method for determining whether a vehicle has entered a building according to an exemplary embodiment of the present disclosure.

FIG. 3 is a flowchart illustrating a method for determining whether a vehicle has entered a building according to an exemplary embodiment of the present disclosure. As shown in FIG. 3, the controller 140 may be configured to obtain the vehicle position information and the traveling information (S210). In 'S210', the controller 140 may be configured to obtain the vehicle position information from the navigation 110, and obtain the vehicle traveling information from the sensor 120.

The controller 140 may be configured to calculate the first traveling distance of the vehicle per hour based on the vehicle position information (S220). In 'S220', the first traveling distance may refer to the traveling distance of the vehicle calculated by the controller 140 by combining the positions of the vehicle received by the GPS receiver for the predetermined period of time. The controller 140 may be configured to calculate the second traveling distance of the vehicle per hour based on the vehicle traveling information (S230). In 'S230', the second traveling distance may refer to the traveling distance of the vehicle calculated by the controller 140 based on the speed information obtained by the wheel speed sensor of the vehicle for the predetermined period of time.

The controller 140 may be configured to determine whether the difference between the first traveling distance and the second traveling distance exceeds the reference value (S240). In response to determining in 'S240' that the difference between the first traveling distance and the second traveling distance exceeds the reference value (Y), the controller 140 may be configured to determine that the vehicle has entered the building (S250). In 'S240', the determination by the controller 140 that the difference between the first traveling distance calculated based on the positions of the vehicle received by the GPS receiver and the second traveling distance calculated based on the wheel speed sensor exceeds the reference value may indicate that the vehicle actually traveled by the second traveling distance but the first traveling distance calculated based on the vehicle position information was not calculated as much as the second traveling distance. This is because the GPS receiver did not accurately receive the position of the vehicle. Therefore, it may be determined that the vehicle has entered the building.

On the other hand, in response to determining in 'S240' that the difference between the first traveling distance and the second traveling distance is less than the reference value N, the controller 140 may be configured to determine that the second traveling distance actually traveled by the vehicle is similar to the first traveling distance calculated based on the position information of the vehicle. This may indicate that the GPS receiver accurately received the position of the vehicle. Thus, it may be determined that the vehicle has not entered the building.

Figure 4:
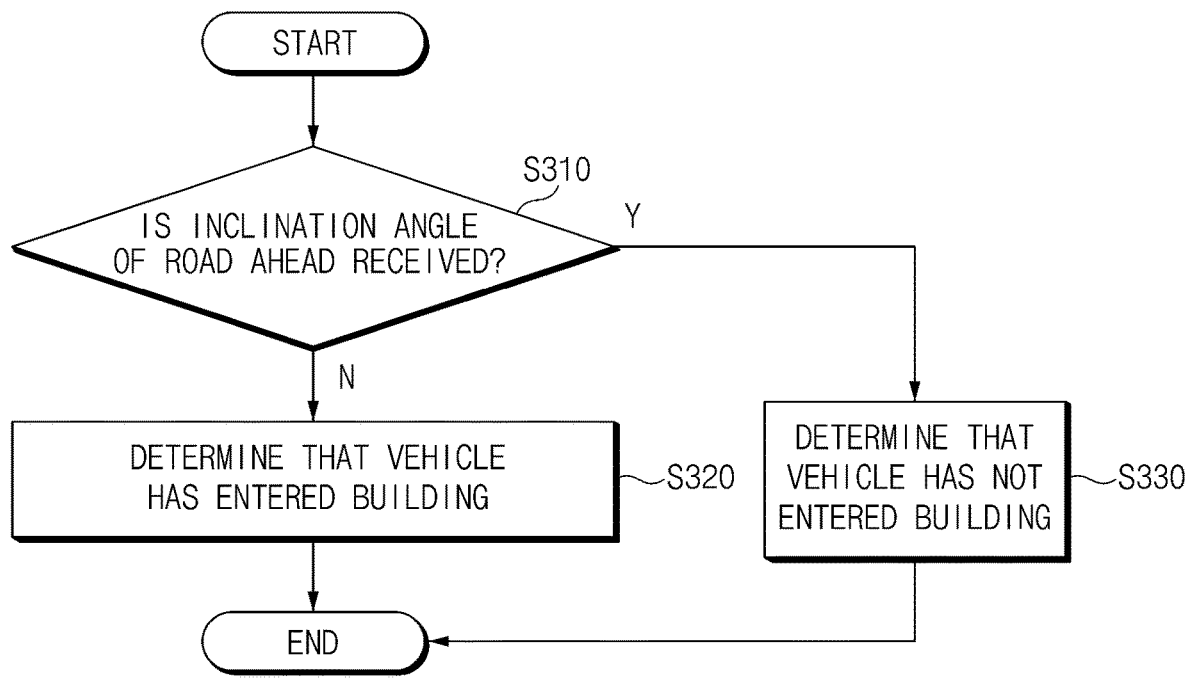
FIG. 4 is a flowchart illustrating a method for determining whether a vehicle has entered a building according to another exemplary embodiment of the present disclosure.

FIG. 4 is a flowchart illustrating a method for determining whether a vehicle has entered a building according to another exemplary embodiment of the present disclosure. As shown in FIG. 4, the controller 140 may be configured to determine whether the road ahead information of the vehicle may be received from the navigation 110 (S310). In 'S310', the road ahead information of the vehicle may include the inclination information of the road surface received by the GPS receiver included in the navigation 110. In response to determining in 'S310' that the road ahead information is unable to be received from the navigation 110 (N), the controller 140 may be configured to determine that the vehicle has entered the building (S320). On the other hand, in response to determining in 'S310' that the road ahead information is able to be received from the navigation 110 (Y), the controller 140 may be configured to determine that the vehicle has not entered the building (S330).

Figure 5:
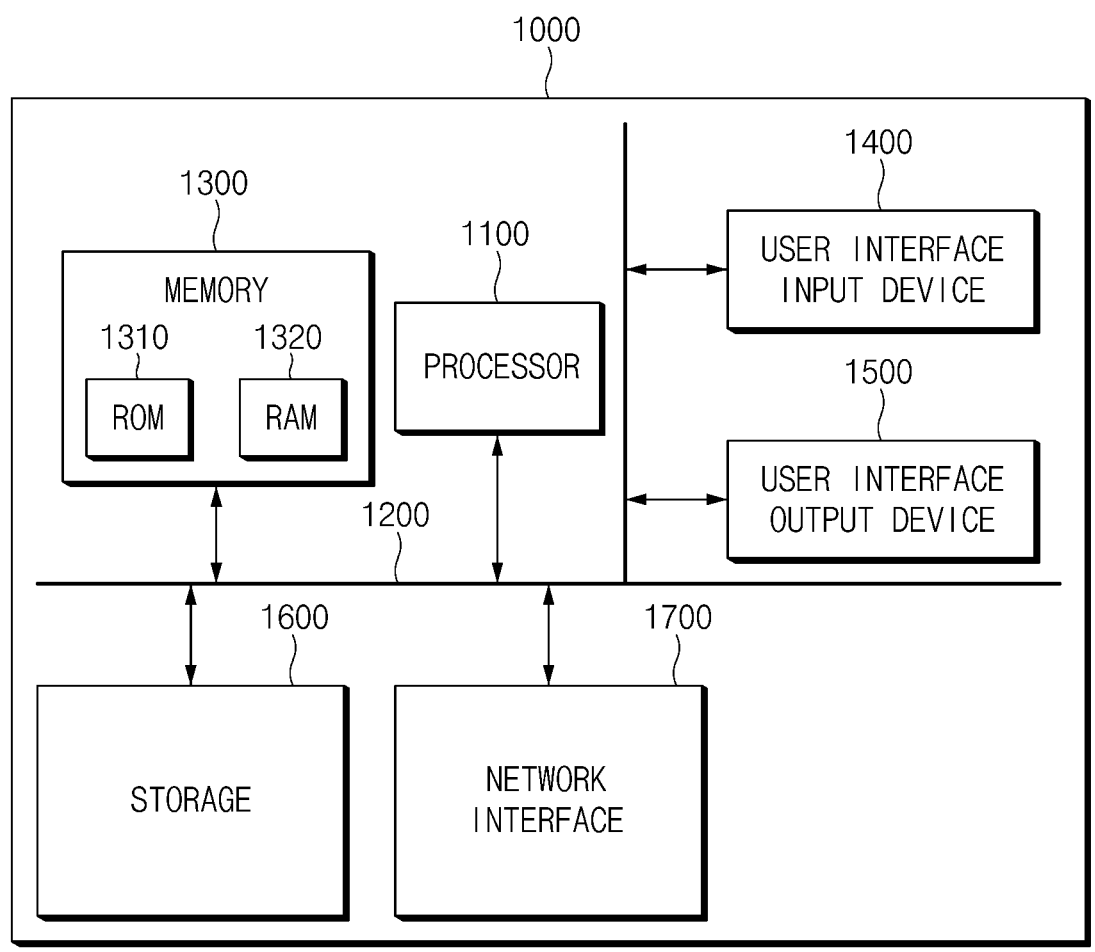
FIG. 5 illustrates a computing system in which a method according to an exemplary embodiment of the present disclosure is implemented.

FIG. 5 illustrates a computing system in which a method according to an exemplary embodiment of the present disclosure is implemented. With reference to FIG. 5, a computing system 1000 may include at least one processor 1100, a memory 1300, a user interface input device 1400, a user interface output device 1500, storage 1600, and a network interface 1700 connected via a bus 1200.

The processor 1100 may be a central processing unit (CPU) or a semiconductor device that performs processing on commands stored in the memory 1300 and/or the storage 1600. The memory 1300 and the storage 1600 may include various types of volatile or non-volatile storage media. For example, the memory 1300 may include a ROM (Read Only Memory) 1310 and a RAM (Random Access Memory) 1320.

Thus, the operations of the method or the algorithm described in connection with the embodiments disclosed herein may be embodied directly in hardware or a software module executed by the processor 1100, or in a combination thereof. The software module may reside on a storage medium (that is, the memory 1300 and/or the storage 1600) such as a RAM, a flash memory, a ROM, an EPROM, an EEPROM, a register, a hard disk, a removable disk, and a CD-ROM. The exemplary storage medium is coupled to the processor 1100, which may read information from, and write information to, the storage medium. In another method, the storage medium may be integral with the processor 1100. The processor and the storage medium may reside within an application specific integrated circuit (ASIC). The ASIC may reside within the user terminal. In another method, the processor and the storage medium may reside as individual components in the user terminal.

The description above is merely illustrative of the technical idea of the present disclosure, and various modifications and changes may be made by those skilled in the art without departing from the essential characteristics of the present disclosure. Therefore, the exemplary embodiments disclosed in the present disclosure are not intended to limit the technical idea of the present disclosure but to illustrate the present disclosure, and the scope of the technical idea of the present disclosure is not limited by the exemplary embodiments. The scope of the present disclosure should be construed as being covered by the scope of the appended claims, and all technical ideas falling within the scope of the claims should be construed as being included in the scope of the present disclosure.

The device and the method for controlling the traveling of the vehicle according to an exemplary embodiment of the present disclosure may improve a riding quality and a stability of the driver by actively adjusting the vehicle height even when the vehicle enters the building and travels on the slope. In addition, the vehicle height may be actively adjusted based on the inclination angle of the vehicle to more easily prevent the lower portion of the vehicle from being damaged.

Hereinabove, although the present disclosure has been described with reference to exemplary embodiments and the accompanying drawings, the present disclosure is not limited thereto, but may be variously modified and altered by those skilled in the art to which the present disclosure pertains without departing from the spirit and scope of the present disclosure claimed in the following claims.

What is claimed is:

1. A device for controlling traveling of a vehicle, comprising:
    a sensor configured to obtain vehicle traveling information;
    a navigation configured to obtain vehicle position information; and
    a controller configured to:
        determine whether the vehicle has entered a building based on the vehicle traveling information and the vehicle position information;
        calculate a traveling control amount based on the determination result,
        calculate a first traveling distance traveled by the vehicle for a predetermined period of time based on the vehicle position information;
        calculate a second traveling distance traveled by the vehicle for the predetermined period of time based on the vehicle traveling information;
        determine whether a difference between the first traveling distance and the second traveling distance exeeds a reference value; and
        determine that the vehicle has entered the building in response to determining that the difference exeeds the reference value;
        wherein the controller is configured to operate a damper using the calculated traveling control amount.

2. The device of claim 1, wherein the controller is configured to calculate an inclination angle of the vehicle based on the vehicle traveling information.

3. The device of claim 1, wherein the vehicle position information includes inclination information of a road surface.

4. The device of claim 3, wherein the controller is configured to determine that the vehicle has entered the building in response to detecting that the inclination information of the road surface is unable to be received.

5. The device of claim 4, wherein the controller is configured to calculate the traveling control amount based on the inclination angle of the vehicle in response to determining that the vehicle has entered the building.

6. The device of claim 5, wherein the controller is configured to:
    calculate a vehicle height based on the inclination angle of the vehicle; and
    calculate the traveling control amount to correspond to the calculated vehicle height.

7. The device of claim 4, wherein the controller is configured to:
    calculate the traveling control amount based on a speed of the vehicle and the inclination angle of the vehicle in response to determining that the vehicle has entered the building.

8. A method for controlling traveling of a vehicle, comprising:
    obtaining, by a controller, vehicle traveling information and vehicle position information;
    determining, by the controller, whether the vehicle has entered a building based on the vehicle traveling information and the vehicle position information;
    calculating, by the controller, a traveling control amount based on the determination result, wherein the determining of whether the vehicle has entered the building includes:
    calculating, by the controller, a first traveling distance traveled by the vehicle for a predetermined period of time based on the vehicle position information;
    calculating, by the controller, a second traveling distance traveled by the vehicle for the predetermined period of time based on the vehicle traveling information;
    determining, by the controller, whether a difference between the first traveling distance and the second traveling distance exceeds a reference value; and
    determining, by the controller, that the vehicle has entered the building in response to determining the difference exceeds the reference value;
    operating, by the controller, a damper using the calculated traveling control amount.

9. The method of claim 8, further comprising:
    calculating, by the controller, an inclination angle of the vehicle based on the vehicle traveling information.

10. The method of claim 8, wherein the vehicle position information includes inclination information of a road surface.

11. The method of claim 10, wherein the determining of whether the vehicle has entered the building includes:
    determining, by the controller, whether the inclination information of the road surface is received; and
    determining, by the controller, that the vehicle has entered the building in response to detecting that the inclination information of the road surface is unable to be received.

12. The method of claim 11, further comprising:
    calculating, by the controller, the traveling control amount based on the inclination angle of the vehicle in response to determining that the vehicle has entered the building.

13. The method of claim 12, further comprising:
    calculating, by the controller, a vehicle height based on the inclination angle of the vehicle; and
    calculating, by the controller, the traveling control amount to correspond to the calculated vehicle height.

14. The method of claim 11, further comprising:
  calculating, by the controller, the traveling control amount based on a speed of the vehicle and the inclination angle of the vehicle in response to determining that the vehicle has entered the building.

\* \* \* \* \*